United States Patent
Imaeda

[19]

[11] Patent Number: 5,969,749
[45] Date of Patent: *Oct. 19, 1999

[54] APPARATUS AND METHOD FOR SUSPENDING A REPRODUCTION OPERATION REPRODUCING IMAGE INFORMATION WHEN THE ARRIVAL OF A CALL FROM A COMMUNICATION LINE IS DETECTED

[75] Inventor: Eiji Imaeda, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/550,782

[22] Filed: Oct. 31, 1995

[30] Foreign Application Priority Data

Nov. 4, 1994 [JP] Japan .................................. 6-271320
Nov. 10, 1994 [JP] Japan .................................. 6-276605

[51] Int. Cl.⁶ .............................. H04N 7/12; H04M 11/00
[52] U.S. Cl. ..................... 348/14; 379/93.09; 379/93.17; 386/83
[58] Field of Search ................... 348/14–19; 379/96–99, 379/110, 93, 53, 54, 387, 93.09, 93.17, 93.23, 110.01, 102.01–102.03; 386/83

[56] References Cited

U.S. PATENT DOCUMENTS

| | | |
|---|---|---|
| 4,425,477 | 1/1984 | Magil ....................................... 379/110 |
| 5,018,186 | 5/1991 | Kimura et al. .............................. 348/18 |
| 5,189,691 | 2/1993 | Dunlap ...................................... 348/14 |
| 5,233,646 | 8/1993 | Kuromi ..................................... 379/110 |
| 5,251,253 | 10/1993 | Chutuk .................................. 379/110.01 |
| 5,510,829 | 4/1996 | Sugiyama et al. .......................... 348/14 |
| 5,528,285 | 6/1996 | Morikawa et al. ......................... 379/96 |
| 5,651,060 | 7/1997 | Cohn et al. ........................... 379/93.35 |
| 5,684,918 | 11/1997 | Abecassis .................................. 386/83 |

FOREIGN PATENT DOCUMENTS

| | | |
|---|---|---|
| 1206637 | 6/1986 | Canada . |
| 31 131 127 | 10/1982 | Germany ............................... 379/387 |
| 2-54696 | 2/1990 | Japan . |
| 2-299361 | 12/1990 | Japan ..................................... 379/53 |
| 7-162837 | 6/1995 | Japan ..................................... 348/14 |
| 9408112 | 9/1994 | Rep. of Korea . |
| 2223911 | 4/1990 | United Kingdom ..................... 379/53 |

*Primary Examiner*—Wing F. Chan
*Attorney, Agent, or Firm*—Fitzpatrick, Cella, Harper & Scinto

[57] ABSTRACT

At the start of a communication, a video and audio output other than the communication is automatically turned off. When a handset is off-hooked or the operation to start the communication is performed by an operation apparatus, a communication control circuit switches a change-over switch to an a contact and turns off a disconnecting switch. When the handset is on-hooked or the operation to finish the communication is executed by the operation apparatus, the communication control circuit switches the change-over switch to a b contact and turns on the disconnecting switch.

12 Claims, 10 Drawing Sheets

APPARATUS AND METHOD FOR SUSPENDING A REPRODUCTION OPERATION REPRODUCING IMAGE INFORMATION WHEN THE ARRIVAL OF A CALL FROM A COMMUNICATION LINE IS DETECTED

BACKGROUND OF THE INVENTION

1. Field of the Invention

The invention relates to a communicating apparatus and a communication system.

2. Related Background Art

In recent years, there have been proposed an apparatus for receiving a television signal by assembling a television tuner into an audio/video communication terminal apparatus such as a television conference terminal, a television telephone, or the like an apparatus providing a line input terminal for a video signal and an audio signal, and an apparatus for outputting a reproduction video signal and a reproduction audio signal of a video reproducing apparatus (such as video tape recorder, video cassette recorder, video disk reproducing apparatus, or the like).

In the communication terminal apparatus having therein a TV receiving function or a line input function as mentioned above, hitherto, there are provided a switch for manually switching an audio signal of a television, a video recorder, or the like and an output of a communication voice of a television telephone or the like, and an output system of the audio signal and an output system of a communication voice are independently provided. In the former case, by the operator manually switching the change-over switch, only one of the audio signal and the voice output can be outputted. For example, prior to starting the television telephone communication, the operator manually switches the change-over switch to the output of the communication voice. In the latter case, output levels of both of the output systems are adjusted by volume switches provided for them, respectively.

Also in the former case, prior to starting the communication, one's communication partner must switch to the voice output each time communication is performed, which is troublesome. After completion of the communication, an operation to again return the change-over switch to the original state has to be executed.

In the latter case, before or just after the start of the communication, operations for reducing the volume of the audio output and for increasing the volume of the audio output after completion of the communication have to be performed.

On the other hand, in the communication terminal apparatus having the TV receiving function or line input function therein, generally, video display means is also commonly used for displaying a video image from the communication partner. In this case, the video image from the communication partner is synthesized as a slave picture plane with another video image and is displayed or a display of the video image from the communication partner and the display of another video image are switched by a change-over switch. In any of those constructions, when the communication is started, the user must manually execute some operation so as to enable the video image from the communication partner to be displayed. After completion of the communication, the user must perform the operation to return the change-over switch to the original state.

SUMMARY OF THE INVENTION

It is an object of the invention to provide an image processing apparatus and an image processing system that can preferably process information that is inputted by a communication apparatus and information that is inputted from an external apparatus which is independent on the information that is inputted by a communication apparatus.

To accomplish the above object, according to an embodiment of the invention, there is provided a communicating apparatus comprising: incoming call detecting means for detecting an incoming call from a communication line; input means for inputting video information from a video information source which is independent of the communication line; selecting means for selecting either one of video information that is inputted from the communication line and the video information from the input means; and control means for controlling the selection of the selecting means in accordance with the incoming call detection by the incoming call detecting means.

Another object of the invention is to provide image processing apparatus and image processing system which can process information that is inputted by a communication line and information that is inputted from an external apparatus that is independent of the information that is inputted by the communication without performing a troublesome operation.

Another further object of the invention is to provide an image processing apparatus and an image processing system having a novel function.

The above and other objects and features of the present invention will become apparent from the following detailed description and the appended claims with reference to the accompanying drawings.

DETAILED DESCRIPTION OF THE PREFERRED EMBODIMENTS

An embodiment of the present invention will now be described in detail hereinbelow with reference to the drawings.

<First Embodiment>

Figure 1:
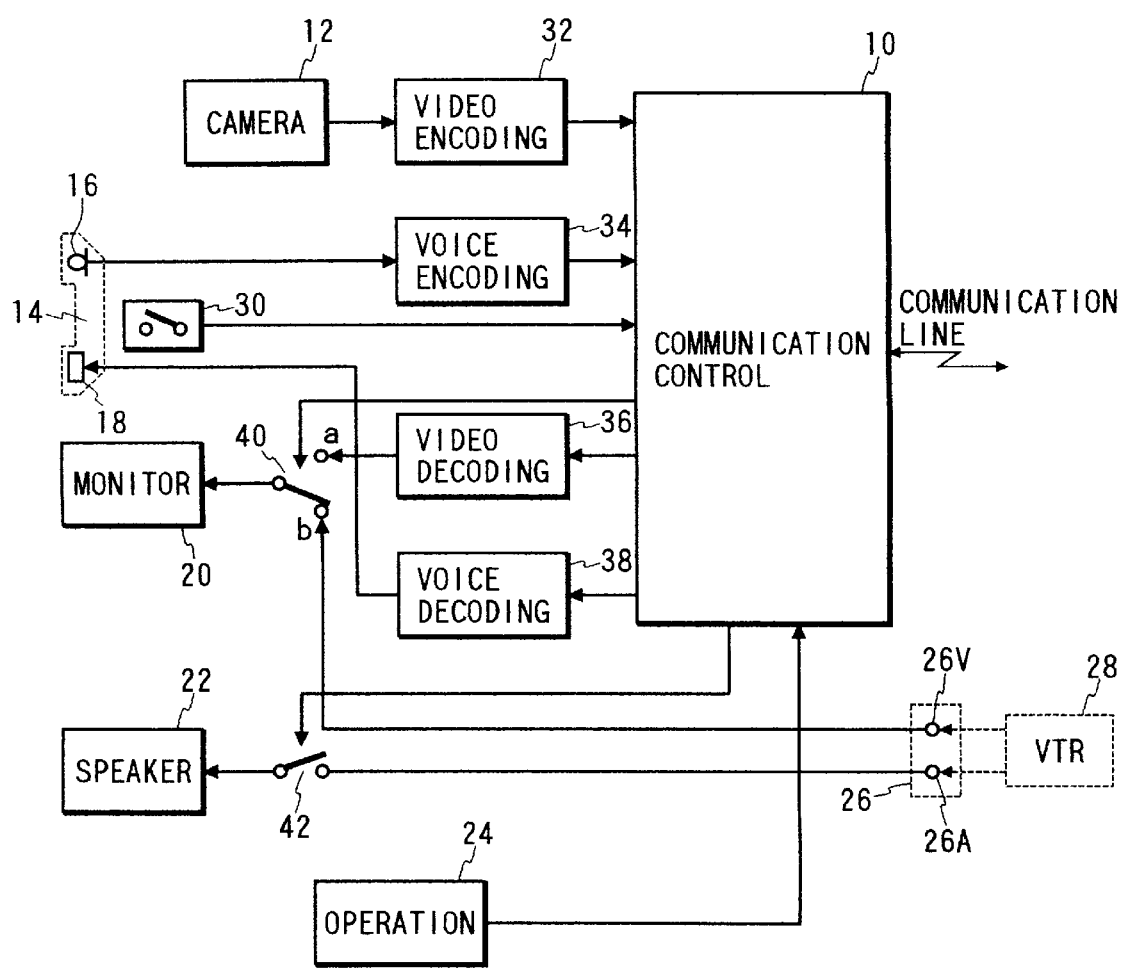
FIG. 1 is a schematic constructional block diagram of the first embodiment.

FIG. 1 is a schematic constructional block diagram of the first embodiment of the invention which is applied to a television telephone. Reference numeral 10 denotes a communication control circuit for controlling the whole communicating operation of the embodiment; 12 denotes a camera for photographing the user and inputting a video image; 14 denotes a handset having therein a microphone 16 and a speaker 18; 20 denotes a monitor for displaying a video image; 22 denotes a speaker; and 24 denotes an operation apparatus comprising ten-key and other operation keys. Reference numeral 26 denotes an external input terminal for inputting a video signal and an audio signal from an external VTR 28 or the like. The external input terminal 26 has a video input terminal 26V and an audio input terminal 26A. Reference numeral 30 denotes a hook switch for detecting an on-hook and an off-hook state of the handset 14. The hook switch 30 is turned off in the on-hook state of the handset 14 and is turned on in the off-hook state of the handset 14.

Reference numeral 32 denotes a video encoding circuit for encoding an output video image of the camera 12 for communication; 34 denotes a voice encoding circuit for encoding a voice signal that is generated from the microphone 16 of the handset 14 into a signal for communication; 36 denotes a video decoding circuit for decoding encoded video information from a communication partner; and 38 denotes a voice decoding circuit for decoding encoded voice information from the communication partner.

Reference numeral 40 denotes a change-over switch for selecting either one of an output (a contact) of the video decoding circuit 36 and a video signal (b contact) from the video input terminal 26V and supplying it to the monitor 20. Reference numeral 42 denotes a disconnecting switch for selectively disconnecting a signal path connecting the audio input terminal 26A and the speaker 22. In an idle state, namely, in a non-communication state, the change-over switch 40 is connected to the b contact and the disconnecting switch 42 is closed.

The communication control circuit 10 controls the communication in accordance with the operation of the operation apparatus 24 and the state of the hook switch 30. When the hook switch 30 is ordinarily turned on from the off-state, the communication control circuit 10 recognizes that the start of communication has been instructed. When the hook switch 30 is turned off from the on-state, the communication control circuit 10 recognizes that the end of communication has been instructed. It will be obviously understood that the communication control circuit 10 starts the communication and finishes it in accordance with a special operation of the operation apparatus 24. In response to the start and end of the communication, the communication control circuit 10 controls the change-over switch 40 and disconnecting switch 42 as will be described hereinbelow.

Figure 2:
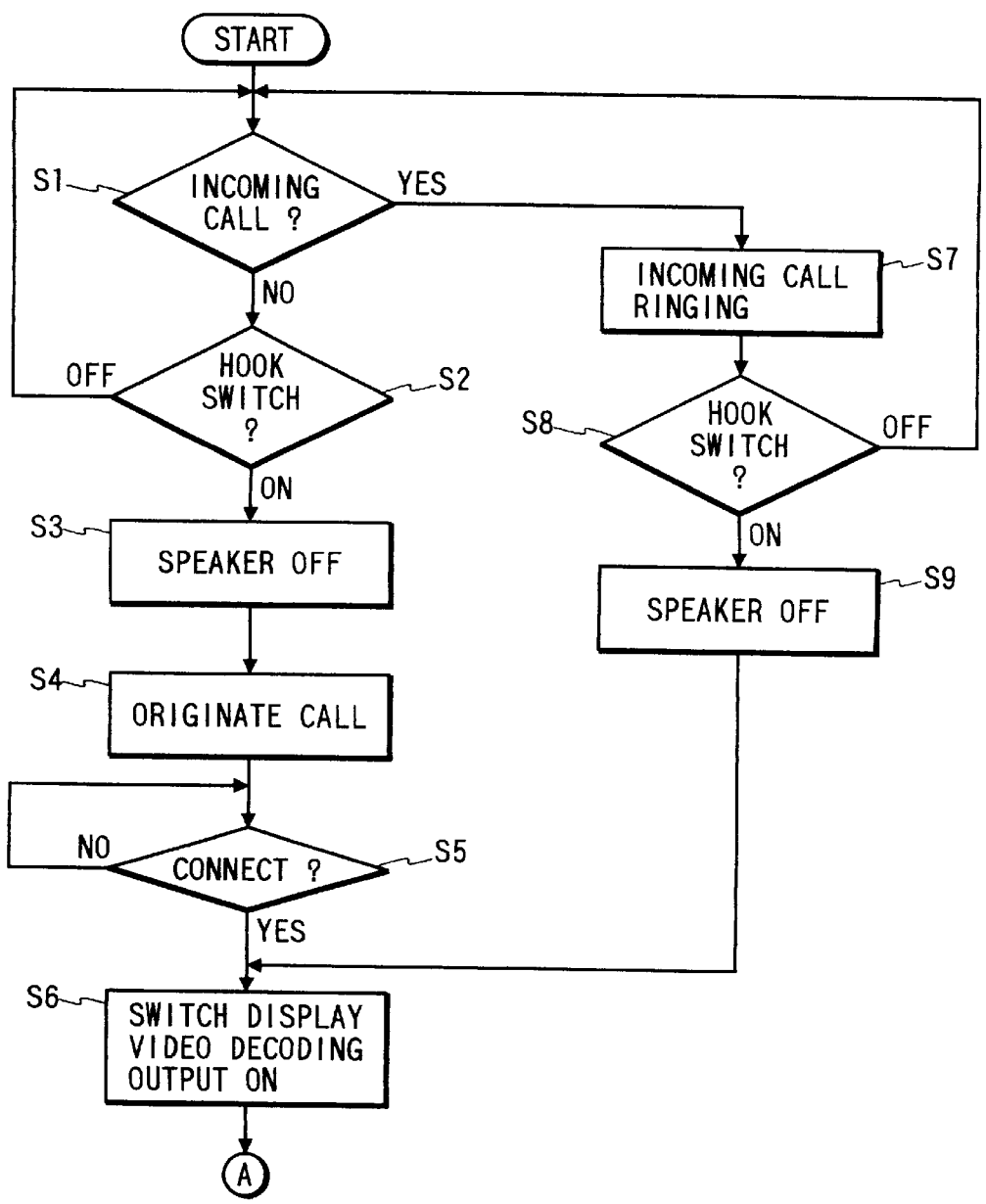
FIG. 2 is a diagram showing a part of an operation flowchart of the first embodiment.
Figure 3:
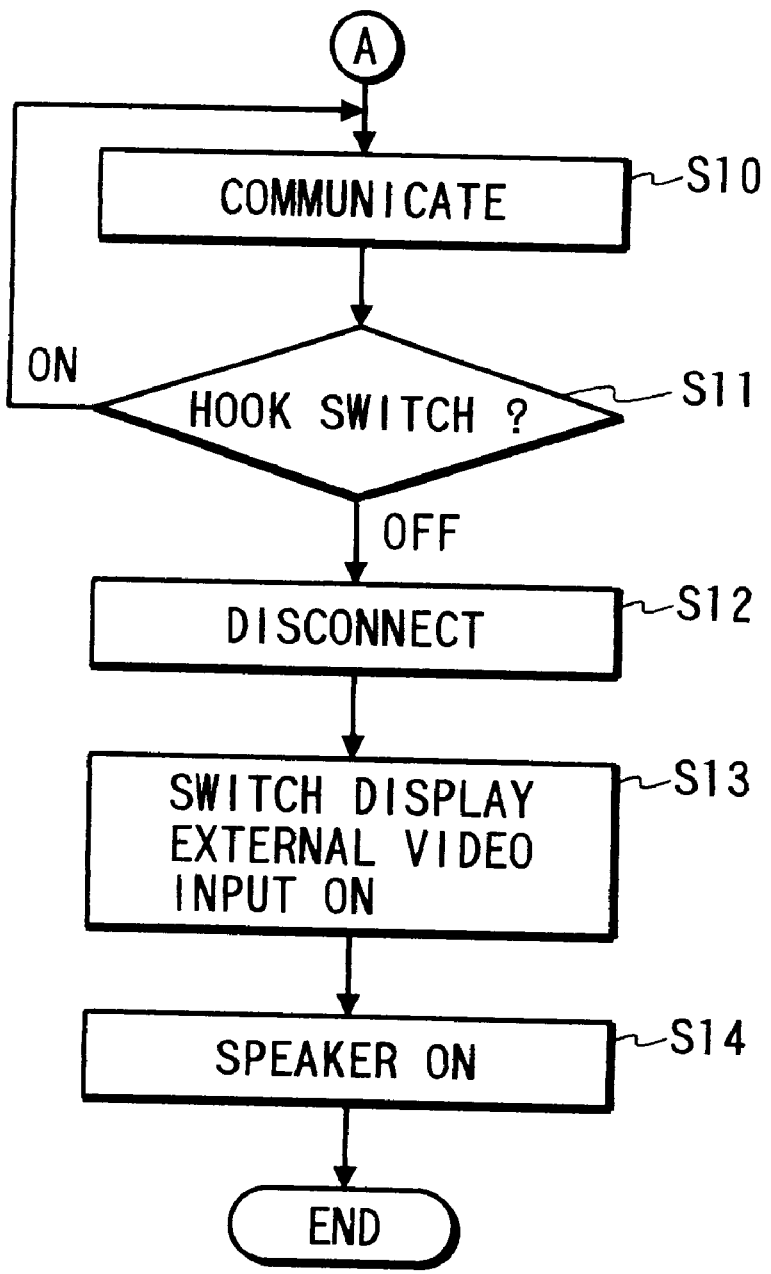
FIG. 3 is a diagram showing a part of the operation flowchart of the first embodiment.

FIGS. 2 and 3 show operation flowcharts of the embodiment as a whole. The operation of the embodiment will now be described with reference to FIGS. 2 and 3.

In a non-communication state, namely, in an idle state, the change-over switch 40 is connected to the b contact and the disconnecting switch 42 is closed. Therefore, the apparatus is in a state in which the video signal that is inputted from the external input terminal 26 is displayed as a video image by the monitor 20 and is outputted as a sound from the speaker 22. In this idle state, the communication control circuit 10 monitors the presence or absence of an incoming call and also discriminates whether the hook switch 30 has been turned on or not (steps S1 and S2).

When the operator picks up the handset 14 in the idle state, the hook switch 30 is turned on (S2). In response to it, the communication control circuit 10 releases the disconnecting switch 42 and turns off the output by the speaker 22 of the audio signal that is inputted from the audio input terminal 26A (S3). An originating call is generated for calling the communication partner in accordance with the originating call number operation of the operator (S4) and the apparatus waits for the connection with the partner's terminal (S5). When the apparatus is connected to the partner's terminal (S5), the change-over switch 40 is switched to the a contact, thereby allowing an output of the video decoding circuit 36 (video image from the communication partner) to be supplied to the monitor 20 (S6). Thus, the user can talk to the communication partner while listening to the voice of the communication partner produced by the speaker 18 of the handset 14 and looking to the video image of the communication partner on the screen of the monitor 20.

On the other hand, the communication control circuit 10 monitors the hook switch 30 during the speech communication. When the hook switch 30 is turned off (S11), the line is disconnected and speech communication is finished (S12). The change-over switch 32 is switched to the b contact (on the video input terminal 26V side) (S13). Further, the change-over switch 42 is returned to ON, thereby setting the control mode to a mode for outputting the audio signal that is inputted to the audio input terminal 26A to be generated from the speaker (S14).

Upon receipt of an incoming call, the apparatus operates as follows. When there is an incoming call in the idle state (S1), an incoming call is rung (S7). Subsequently, a state of the hook switch 30 is detected (S8). A processing loop in steps S1 and S7 is repeated until the apparatus is set into a state in which the handset is picked up (namely, the hook switch 30 is on). When the hook switch 30 is turned on, the communication control circuit 10 turns off the change-over switch 42, thereby stopping the generation of the audio signal that is inputted to the audio input terminal 26A from the speaker (S9). The change-over switch 40 is switched to the a contact (output of the video decoding circuit 36) (S6). The apparatus enters a speech communication state (S10). The communication control circuit 10 monitors the hook switch 30 during the speech communication. When the hook switch 30 is turned off (S11), the line is disconnected and the speech communication is finished (S12). The change-over switch 32 is switched to the b contact (on the video input terminal 26V side) (S13). Further, the change-over switch 42 is returned to ON, thereby setting the control mode into a mode for generating the audio signal that is inputted to the audio input terminal 26A from the speaker (S14).

When the line is disconnected on the partner side during the speech communication, the communication control circuit 10 obviously stops the operation of each section, which is necessary for the speech communication. It is also possible to switch the control mode to a mode for outputting external video and audio signals simultaneously with the disconnection of the line. However, if such a mode switching is performed, the picture plane of the monitor 20 is suddenly switched and a sound is generated from the speaker 22 irrespective of the will of the user, so that it is unpreferable. In the embodiment, since the control mode is switched to the mode for outputting the external video and audio signals in response to the operation of returning the handset to the on-hook state, such an inconvenience doesn't occur.

According to the embodiment as mentioned above, since the generation of the external video and audio signals is automatically turned off when speech communication is started, the user can engage in a conversation with the television telephone without being interrupted by them. On the other hand, since the generation of the external video and audio signals is automatically turned on when the speech communication is finished, there is no need to perform the operation for purposely manually switching to obtain such a generation of external signals.

<Second Embodiment>

Figure 4:
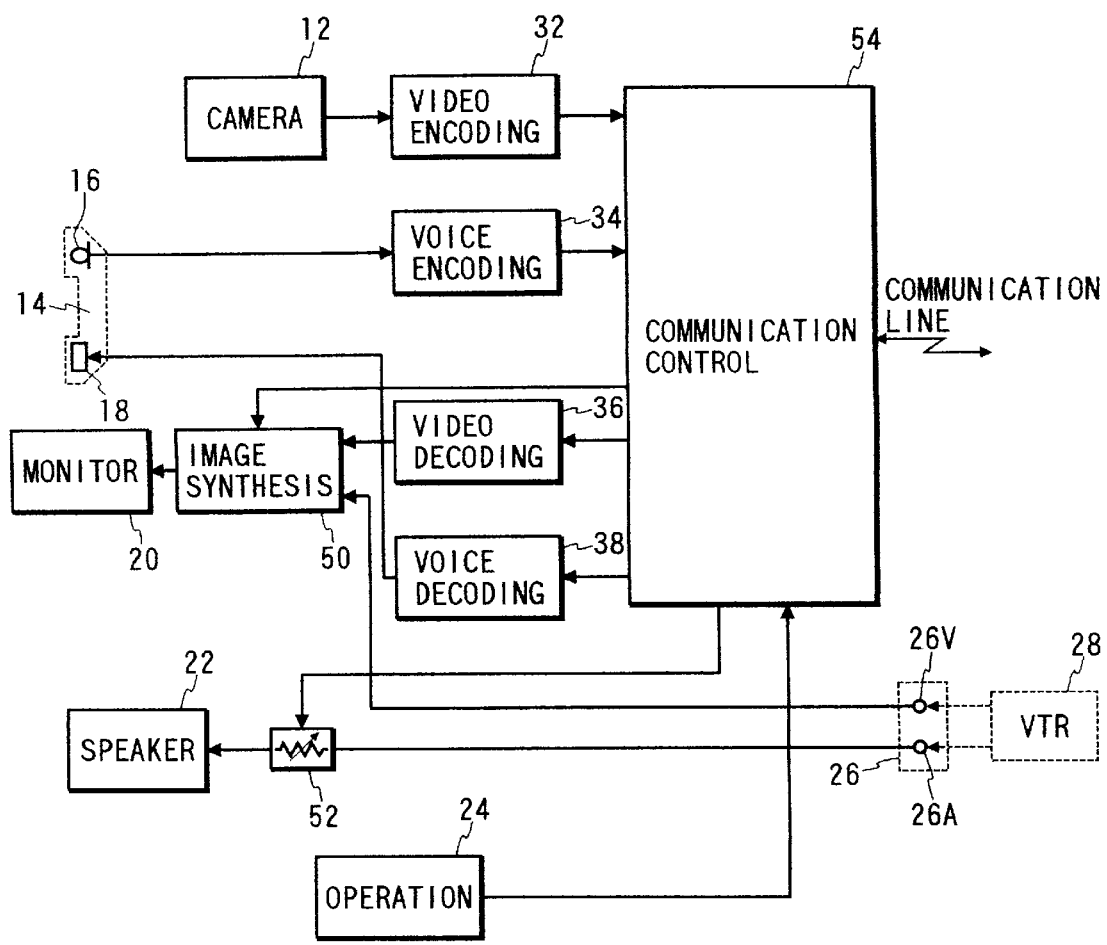
FIG. 4 is a schematic constructional block diagram of the second embodiment of the invention.

FIG. 4 shows a schematic constructional block diagram of the second embodiment of the invention. In the embodiment, in place of the change-over switch 40 of the embodiment shown in FIG. 1, an image synthesis circuit 50 for synthesizing the output video signal from the video decoding circuit 36 as a slave picture plane and the video signal from the video input terminal 26V as a master picture plane by a picture-in-picture (PinP) system is provided, and in place of the change-over switch 42, a gain control circuit 52 which can freely adjust the output level of the speaker 22 is provided. In the embodiment, the hook switch 30 is eliminated, the communication control circuit 54 detects the on-hook/off-hook state by the operation of the operation apparatus 24 and controls the on/off operation of the image synthesis circuit 50 and the gain of the gain control circuit 52. Since the other component elements are substantially the same as those in FIG. 1, they are designated by the same reference numerals.

The display style of the output video signal is not limited to such master picture plane and slave picture plane. Any display style, such as a display method of equivalently displaying both of the video images so long as the video images from the video decoding circuit 36 and video input terminal 26V can be displayed.

Figure 5:
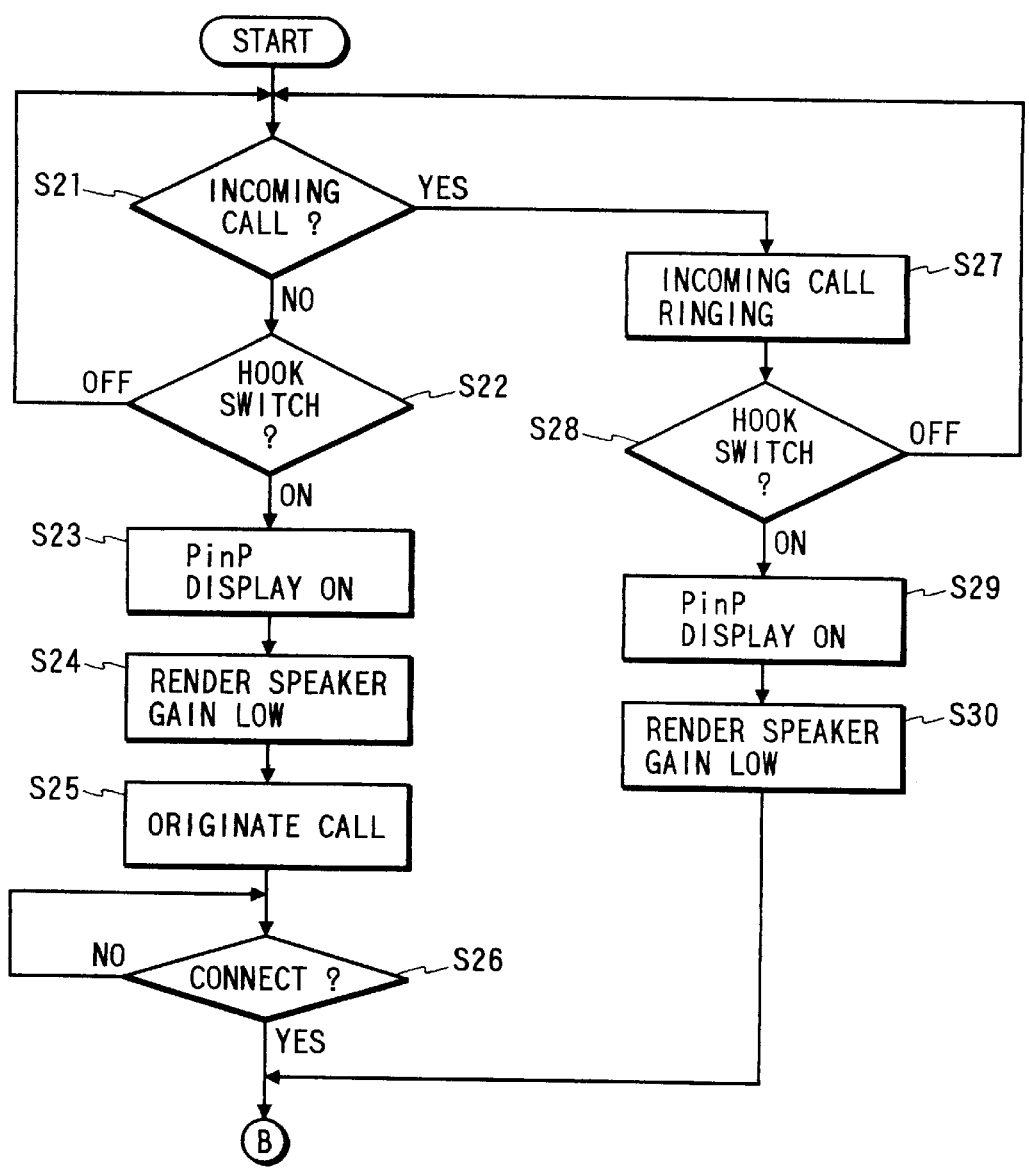
FIG. 5 is a diagram showing a part of an operation flowchart of the second embodiment.
Figure 6:
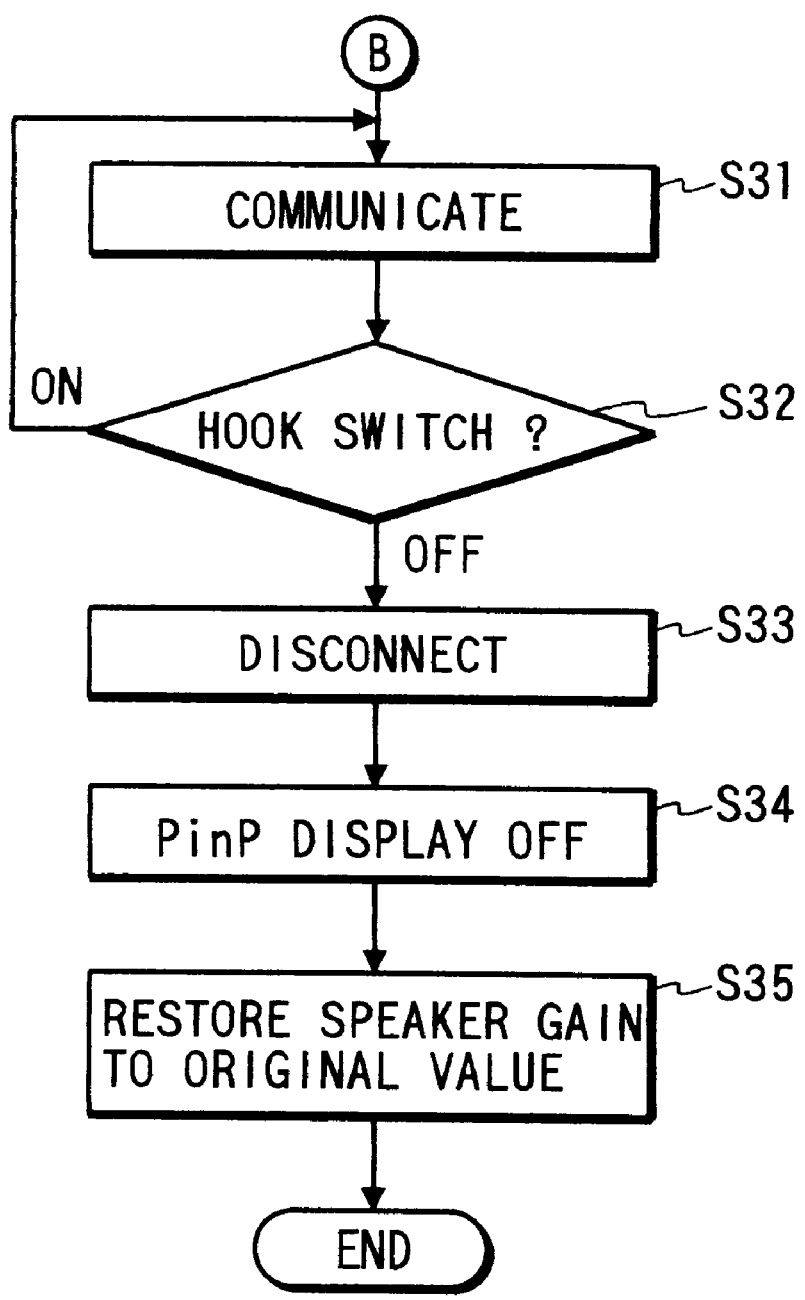
FIG. 6 is a diagram showing a part of the operation flowchart of the second embodiment.

FIGS. 5 and 6 show operation flowcharts of the embodiment shown in FIG. 4 as a whole. The operation of the embodiment shown in FIG. 4 will now be described with reference to FIGS. 5 and 6.

In the embodiment shown in FIG. 4, in a non-communication state, namely, in an idle state, the image synthesis circuit 50 is in a mode (PinP off) for displaying the video signal from the video input terminal 26V on a full screen. In this idle state, the communication control circuit 54 checks for the presence or absence of the incoming call and discriminates whether the hook switch 30 has been turned on or not (S21, S22).

When the operator performs an operation to start the originating call by inputting such information into the operation apparatus 24 during the idle state (S22), the communication control circuit 54 turns on the PinP display of the image synthesis circuit 50 (namely, a slave picture plane to display the output video signal of the video decoding circuit 36 is set) in response to it (S23). The gain of the gain control circuit 52 is also reduced, thereby decreasing the output level of the speaker 22 (including a case of setting the output level to zero) (S24). In accordance with an originating call number operation of the operator, an originating call is generated and transmitted to the communication partner (S25). The apparatus waits for the connection with the partner terminal (S26). When the apparatus is connected to the partner's terminal (S26), the video image of the communication partner is displayed on the slave picture plane of the monitor 20 and the user can listen to the partner's voice with the speaker 18 of the handset 14 (S31).

During speech communication, a communication control circuit 54 monitors the presence or absence of an operation representing the finishing of the communication from the operation apparatus 24 (S32). When the operation to finish the communication is inputted (S32), the line is disconnected and the speech communication is finished (S33). The PinP display of the image synthesis circuit 50 is turned off (S34). The gain of the gain control circuit 52 is returned to the original state (S35).

Upon receipt of an incoming call, the apparatus operates as follows. When there is an incoming call in the idle state (S21), the incoming call is rung (S27). A processing loop in steps S21 and S27 is repeated until the operation to accept the incoming call is executed by the operation apparatus 24 (S28). When the operation to accept the incoming call is performed (S28), the communication control circuit 54 turns on the PinP display of the image synthesis circuit 50 (S29) and the gain of the gain control circuit 52 is reduced (S30). The apparatus enters the speech communication state (S31). During speech communication, the communication control circuit 54 monitors the presence or absence of an operation for finishing the communication from the operation apparatus 24 (S32). When the operation to finish the communication is inputted (S32), the line is disconnected and the speech communication is finished (S33). The PinP display of the image synthesis circuit 50 is turned off (S34). The gain of the gain control circuit 52 is returned to the original state (S35).

In the embodiment shown in FIG. 4 as mentioned above, the PinP display to display the video image of the communication partner as a slave picture plane is automatically made effective at the start of the speech communication and the external audio output level decreases. Therefore, the user can talk while listening to and looking at the external input video image (and sound) at low levels such as not to obstruct the conversation using the television telephone. When the speech communication is finished, the PinP is automatically turned off, the external video image is displayed on a full screen, and the gain of the external audio output is returned to the original state, so that the apparatus can be returned to the original state before the communication without the need for performing a troublesome operation.

<Third Embodiment>

Figure 7:
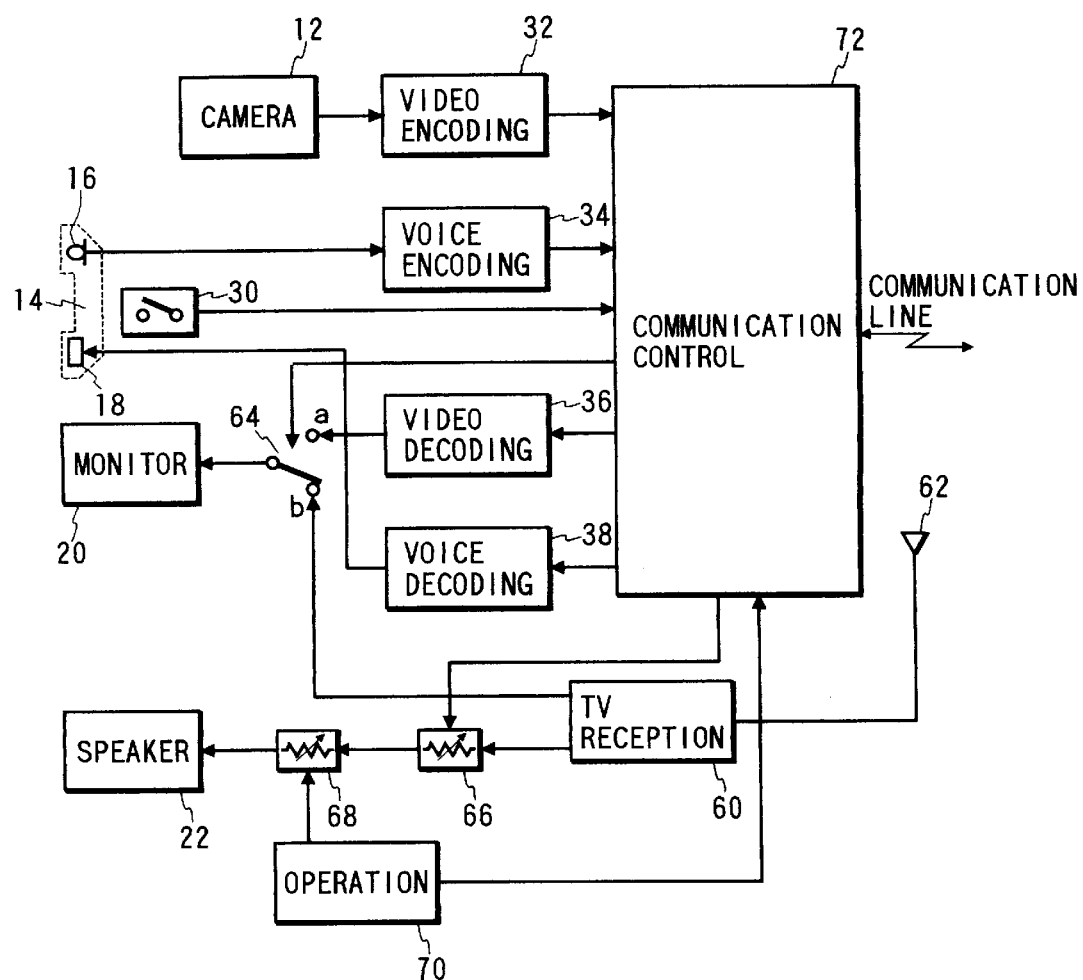
FIG. 7 is a schematic constructional block diagram of the third embodiment.

FIG. 7 shows a schematic constructional block diagram of the third embodiment of the invention. In the embodiment, in place of the external input terminal 26, a TV reception circuit 60 and a TV antenna 62 are provided. A change-over switch 64 selects an output video signal (a contact) of the video decoding circuit 36 or an output video signal (b contact) of the TV reception circuit 60 and supplies the selected signal to the monitor 20. An audio output of the TV reception circuit 60 is supplied to the speaker 22 through gain control circuits 66 and 68. An operation apparatus 70 has operating means for controlling the gain of the gain control circuit 68 in addition to ordinary operating means for communication. A communication control circuit 72 detects the on-hook/off-hook by the operations of the hook switch 30 and/or the operation apparatus 24, controls the change-over switch 64, and controls the gain of the gain control circuit 66. The other component elements are similar to those of FIG. 1 and are designated by the same reference numerals.

The embodiment differs from the first and second embodiments in that the video and audio source other than the communication source is not an external input but is built in as the TV reception circuit 60 and the speaker output level can be controlled at two stages by the gain control circuits 66 and 68. In the embodiment, when communication is started, the video output of the TV reception circuit 60 is switched from the communication partner to the video output and the audio output level of the TV reception circuit 60 is reduced (or turned off). At the end of the communication, the video image of the TV reception circuit 60 is displayed and the voice output level of the TV reception circuit 60 is returned to the original state. Fundamentally, the same function and effect as those in the embodiment shown in FIG. 1 or 4 can be obtained. Even in the embodiment, it will be obviously understood that an image synthesis circuit to realize the PinP display can be used in place of the change-over switch 64 and a disconnecting switch can be also used in place of the gain control circuit 66.

In the embodiment, since the gain control circuits 66 and 68 of two stages are provided for the speaker output, there are the following function and effect. Namely, it is now assumed that the gain of the gain control circuit 66 is equal to 0 dB in the non-communication state and to −20 dB upon communication and that the gain of the gain control circuit 68 has been set to −3 dB by the operator. In this instance, the gain of the sound that is reproduced and generated from the speaker 22 is equal to −3 dB upon non-communication. When the communication is started, the communication control circuit 72 controls the gain of the gain control circuit 66 to −20 dB, so that the gain of the sound that is reproduced and generated from the speaker 22 is set to −23 dB. When the communication is finished, since the gain of the gain control circuit 66 is returned to 0 dB, the gain of the sound that is reproduced and generated from the speaker 22 is again returned to −3 dB.

Thus, the output volume of the speaker 22 can be set to an arbitrary desired value.

<Fourth Embodiment>

The first and second embodiments have been described with respect to the example in which the VTR is shown as an external input. The third embodiment has been described with respect to the example in which the TV reception is shown as an external input. However, the fourth embodiment will be explained with respect to an example in which the process performed in response to an originating call and a process performed in response to receiving an incoming call are made to differ in accordance with an external input.

Explaining the embodiment in more detail, a communication control circuit 85 detects whether the present external input is derived from the VTR 28 or TV reception circuit 60. When there is an input from the VTR 28, the VTR can also subsequently execute a reproducing process later owing to the characteristics of the VTR 28. Therefore, when the video input which is displayed on the monitor 20 is set to an input from the communication partner, namely, a signal from the video decoding circuit and the input from the TV reception circuit is displayed as a video image, the TV receives a broadcasting radio wave and needs to display images in a real-time manner. Therefore, the input from the TV reception circuit and the signal from the video decoding circuit as an input from the communication partner are displayed in the PinP (picture in picture) mode.

Figure 8:
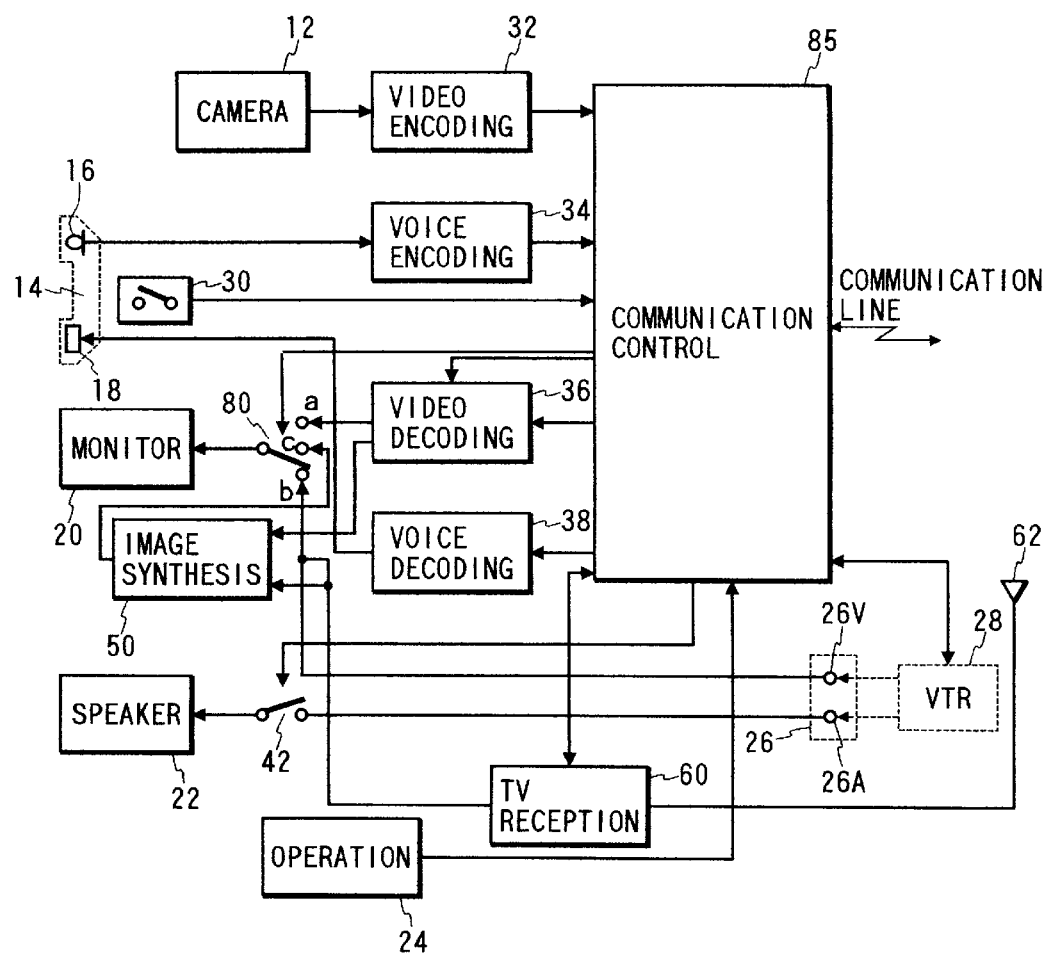
FIG. 8 is a schematic constructional block diagram of the fourth embodiment.
Figure 9:
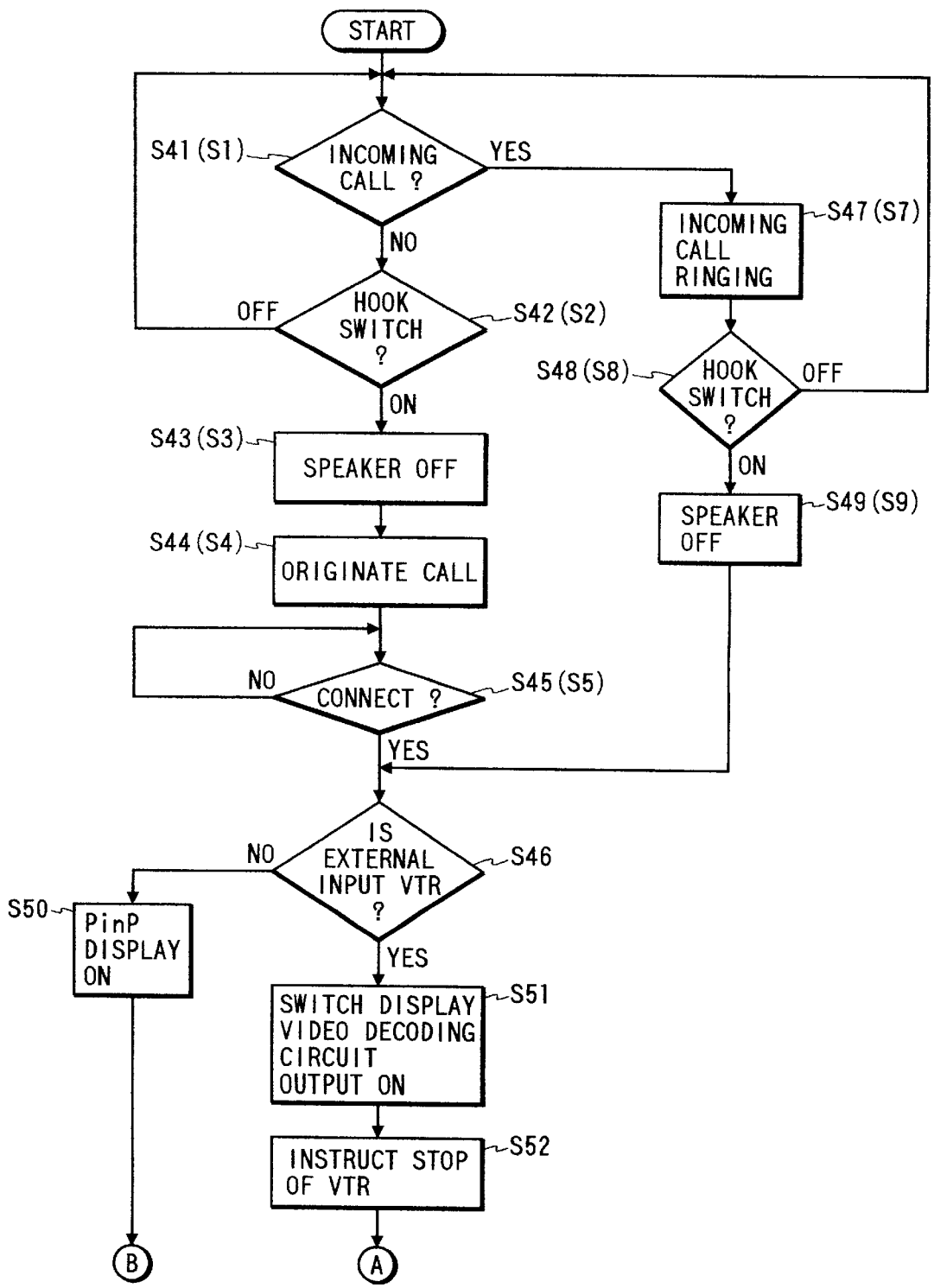
FIG. 9 is a diagram showing a part of an operation flowchart of the fourth embodiment.
Figure 10:
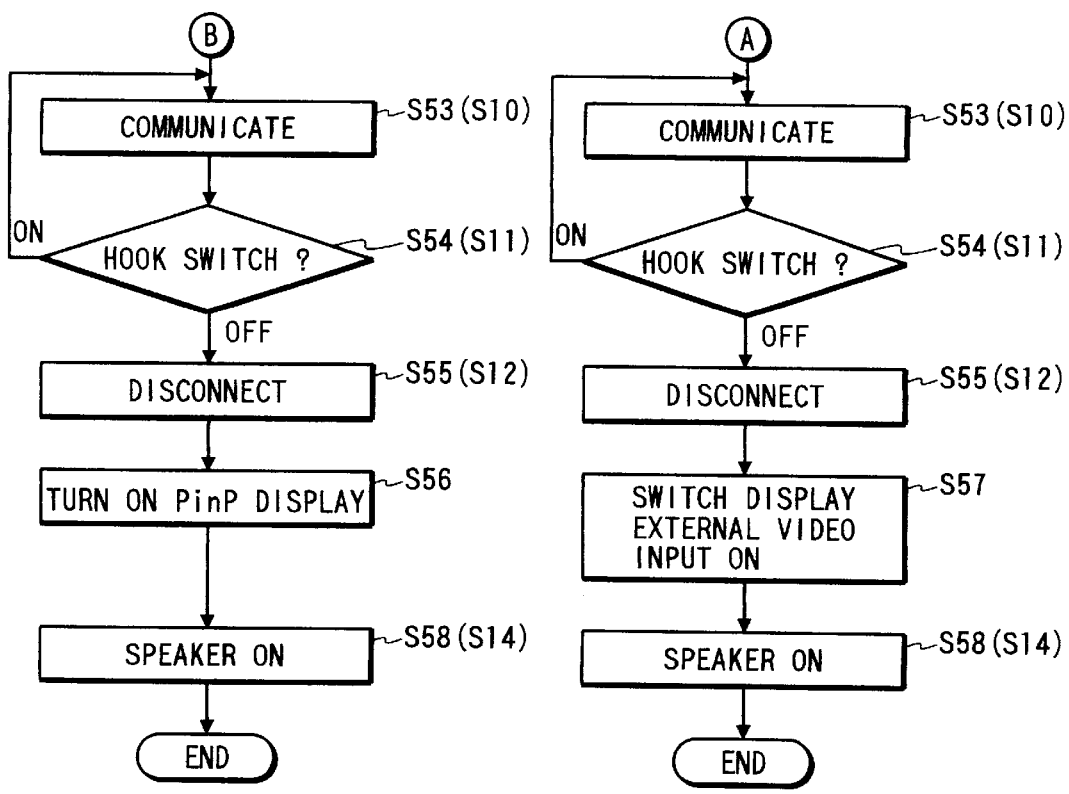
FIG. 10 is a diagram showing a part of the operation flowchart of the fourth embodiment.

FIG. 8 is a schematic constructional block diagram of the embodiment. FIGS. 9 and 10 are operation flowcharts of the embodiment.

Portions with substantially the same constructions as those in FIG. 1 are designated by the same reference numerals and their descriptions are omitted. In the flowcharts of FIGS. 9 and 10 as well, processing steps are almost similar to those in the flowchart of the first embodiment. Therefore, only different processing steps will be explained.

The communication control circuit 85 has a discriminating unit for discriminating whether the present external input is derived from the VTR 28 or the TV reception circuit.

When a discrimination result by the discriminating unit (corresponding to step S46 of the flowchart of FIG. 9) shows the external input from the VTR 28, a selecting switch 80 is switched from b to a so as to stop the input from the VTR 28 and to display the communication video image from the video decoding circuit 36 onto the monitor 20 (S51, S52). When the external input is derived from the video image from the TV reception circuit 60, the selecting switch 80 is switched from b to c so as to display onto the monitor 20 the PinP image obtained by synthesizing the video signal from the TV reception circuit 60 to the video input from the video decoding circuit (S50). In response to the end of the speech communication, the display is returned to the state before the communication (S53–S58). Although the example in which the on/off operation about the voice is switched has been shown and described in the fourth embodiment, the invention is not limited to such an example. The voice level can be also controlled by a volume control in a manner similar to the second and third embodiments.

In each of the above embodiments, any one of an analog public telephone network and a digital communication network such as an ISDN or the like can be also used as a communication line. Further, any one of a moving image and a still image can be also used as a video signal.

In each of the above embodiments, although the communication has been controlled by the hook switch, it will be obviously understood that a handset of a cordless telephone can be also used as a handset and that a hook switch can be also used as an on/off operation of a speech communication button on the handset.

In each of the embodiments, although the operation apparatus 24 and handset 14 have been separately constructed, they can be also integrated as a single cordless handset.

As will be easily understood from the above description, according to the embodiments 1 to 3, when the communication is started, the audio output other than the communication is automatically attenuated or disconnected and, after completion of the communication, the audio output is automatically recovered. Thus, the troublesome operations for purposely manually attenuating or disconnecting the audio output and for manually returning to the original state can be omitted.

The same shall also apply to the video image. When the communication is started, the video output other than a communication is switched to the video output of the communication or the video image other than the communication and the video image of the communication are synthesized and displayed and they are automatically returned to the original state by the end of the communication. Thus, the troublesome operations for purposely manually switching the video display at the start of the communication and the end of the communication can be omitted.

Although the above embodiments have been described with respect to the TV telephone as an example, the invention can be also obviously applied to another communication apparatus and communication system, such as a TV conference system or the like.

The present invention is not limited to the foregoing embodiments but many modifications and variations are possible within the spirit and scope of the appended claims of the invention.

What is claimed is:

1. An apparatus comprising:
   reproducing means for reproducing image information recorded on a medium;
   detecting means for detecting arrival of a call from a communication line;
   control means for suspending a reproducing operation performed by said reproducing means when said detecting means detects the arrival of a call and outputting image information corresponding to the call; and supplying means for supplying real time image information wherein said control means synthesizes the real time image information from said supplying means and image information corresponding to the call when said detecting means detects the call.

2. The apparatus according to claim 1, wherein the image information is motion image information.

3. The apparatus according to claim 1, wherein the arrival of the call comprises the arrival of image information.

4. The apparatus according to claim 1, wherein said reproducing means comprises a VTR.

5. The apparatus according to claim 1, wherein said controls means stops the reproducing operation of said reproducing means in accordance with the detection of the arrival of a call by said detecting means.

6. The apparatus according to claim 1, wherein said control means stops the reproducing operation of said reproducing means when detecting an off-hook state of a hook switch and said detecting means detects the arrival of a call from the communication line.

7. A control method for an apparatus, said method comprising the steps of:

reproducing image information recorded on a medium;

detecting the arrival of a call from a communication line;

suspending a reproducing operation performed by said reproducing step when said detecting step detects the arrival of a call and outputting image information corresponding to the call;

supplying real time image information; and synthesizing the supplied real time image information and image information corresponding to the call when said detecting step detects the call.

8. The method according to claim 7, wherein the image information is motion image information.

9. The method according to claim 7, wherein the arrival of the call comprises the arrival of image information.

10. The method according to claim 7, wherein said reproducing step is performed with a VTR.

11. The method according to claim 7, wherein said control step stops the reproducing operation of said reproducing step in accordance with the detection of the arrival of a call by said detecting step.

12. The method according to claim 7, wherein said control step stops the reproducing operation when detecting an off-hook state of a hook switch and said detecting step detects the arrival of a call from the communication line.

* * * * *